Aug. 8, 1944.    J. A. BENNETT    2,355,047
NONLINEAR MODULATING SYSTEM
Filed Feb. 24, 1942    2 Sheets-Sheet 1
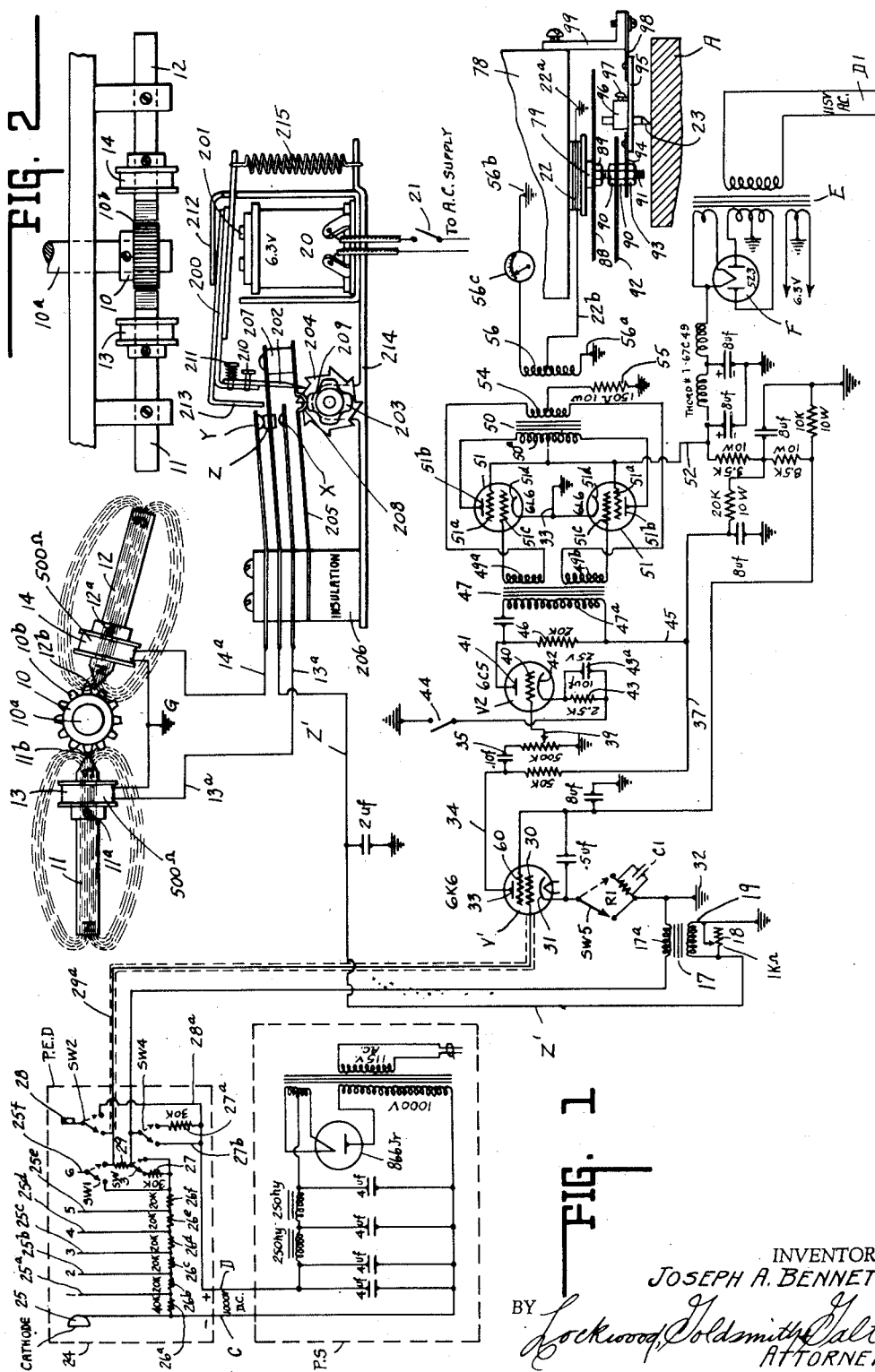
INVENTOR.
JOSEPH A. BENNETT.
BY Lockwood, Goldsmith & Galt
ATTORNEYS.

Aug. 8, 1944.   J. A. BENNETT   2,355,047
NONLINEAR MODULATING SYSTEM
Filed Feb. 24, 1942   2 Sheets-Sheet 2
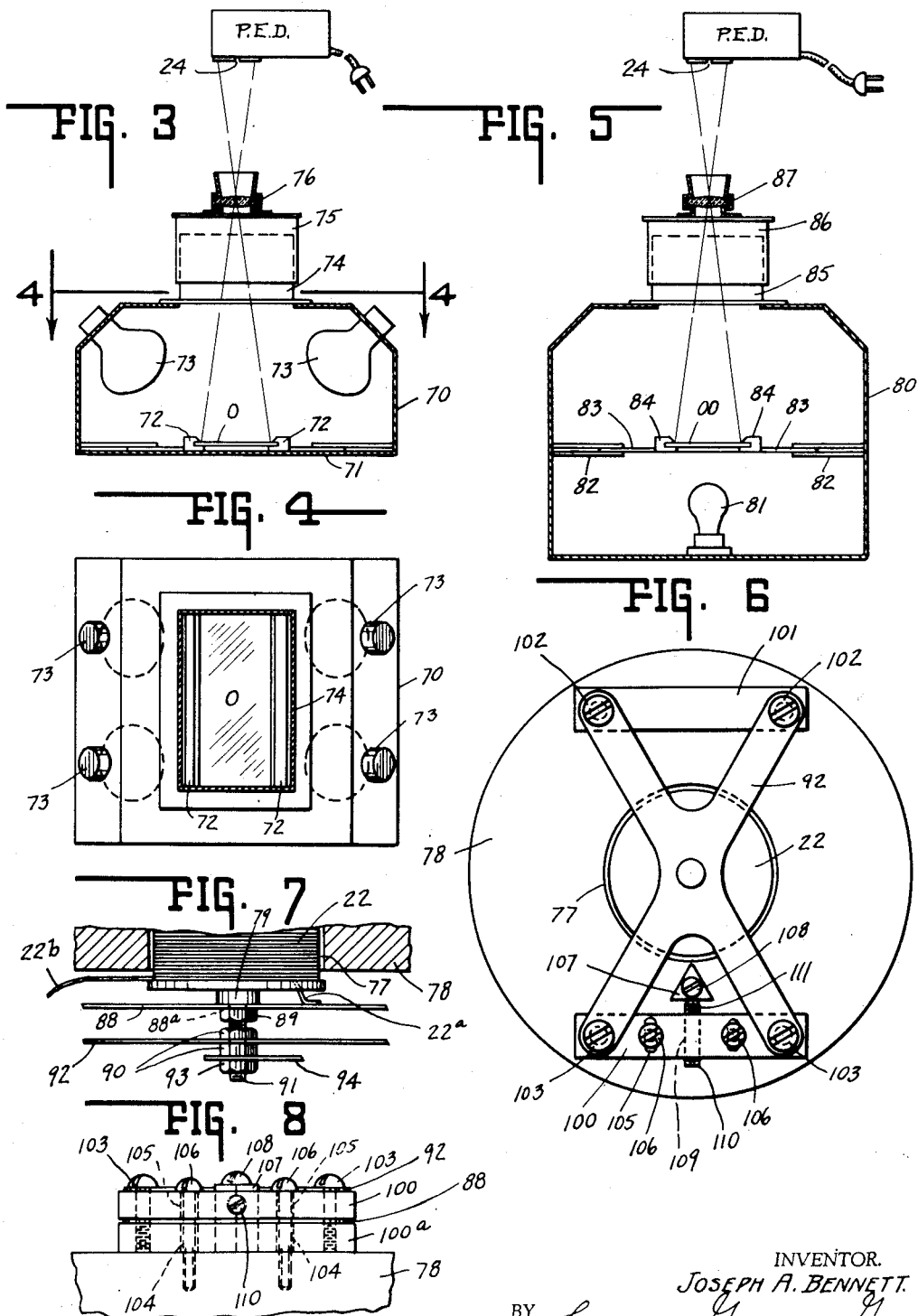
INVENTOR.
JOSEPH A. BENNETT
BY Lockwood, Goldsmith & Galt
ATTORNEYS.

UNITED STATES PATENT OFFICE 2,355,047

NONLINEAR MODULATING SYSTEM

Joseph A. Bennett, Anderson, Ind., assignor to Lynch Corporation, Anderson, Ind., a corporation Application February 24, 1942, Serial No. 432,284

23 Claims. (Cl. 178—6.6)

This invention relates to apparatus for producing printing plates from negatives and positive copy by scanning same when suitably illuminated, the transparent or translucent copy illumination being passed through the copy while the opaque copy illumination is reflected therefrom upon a light reception and tool control energizing arrangement.

Reference is had to the prior Patent No. 2,209,183 dated July 23, 1940, by way of example, illustrating a general organization suitable for the aforesaid operation.

The present invention, therefore, is directed to improvements upon certain portions of the organization illustrated therein. As recited therein, the printing plate to be formed may move relative to the forming tool or the reverse may occur. Similarly the copy or the scanning device may move relative to the other.

Since the aforesaid and said patent summarizes in sufficient detail the general type of apparatus in which the present invention may be included, further reference will be had hereinafter to the specific improvements in question. By the foregoing, however, it is not intended to exclude use of said improvements in similar devices.

Primarily, this invention relates to a system of translating light intensity from copy to a reproducing element and more particularly involves the element of a non-linear modulator.

One chief object of the invention is to provide a method and means for amplifying the effects of low values of light intensities and at the same time mixing with these amplified effects of said intensities a timing signal or carrier current so that the output of the amplifying mechanism will record on a proper medium the values corresponding to the copy and in relation to the timing signal.

One chief feature of the invention is that it includes a photo emissive cell with an aperture to permit light to fall on the cathode of the cell, an impulse generator to provide the aforesaid timing signal, a transformer to introduce the timing signal to the grid circuit, a modulating tube to amplify the modulated timed signal and an audio-type, transformer-coupled amplifier to carry the modulated signal to a reproducing device, whereby the modulated signal may be recorded on the medium for reproduction, in this particular instance, a printing plate.

In applications where it is expedient to mix an alternating current signal with the current from a phototube it is found that to operate the vacuum tube at its proper characteristic a separate source of negative bias is necessary. This always proves difficult to maintain and critical to adjust. In the case of a separate bias supply a great deal of filtering is necessary to provide a ripple free direct current voltage supply. Batteries may be used but their life is limited and a reduced voltage would change the operating characteristics of the vacuum tube. This would, of course, either distort the signal or cause a change in the amplification of the tube. Cathode bias is used in some cases but is found to be unsatisfactory due to high plate voltages and voltage drop across certain tubes. Another deficiency is found in that variable cathode resistors, capable of carrying high plate-cathode currents, are not adapted to the particular usages found necessary.

By use of the non-linear modulator arrangement, therefore, it has been found that tonal values of a subject, say a photographic positive print, might be translated on to the proper medium in conjunction with a timing signal so that halftone reproductions may be made.

Another chief object of this invention is to provide a timing signal of controlled repetitious character operative throughout one translation of the moving element of the device and operatively ineffective upon return movement thereof and which upon lateral indexing is operatively effective in like manner but displaced 180° in phase relation for the formation of the printing surface in accordance with the tonal values of the copy and between the previous surface formations although offset therefrom by said indexing.

The chief feature of the invention corresponding to this object is the specific form of timing signal and controls therefor, which signal is supplied as a carrier current to the reproducing device for its normal effective operation as hereinafter pointed out.

Another chief object of this invention is to provide a signal responsive tool support that can be so adjusted to resonance that but slight power is required for its operation.

The chief feature of the invention corresponding thereto is the provision of a support suitably tensioned for the purpose set forth.

Another object of this invention is to provide an arrangement for receiving copy and so associating same with the scanning portions of the apparatus that reductions, enlargements or reproductions of such copy may readily be effected simultaneously in the scanning.

Other objects and features of this invention will be set forth more fully hereinafter.

The full nature of the invention will be understood from the accompanying drawings and the following description and claims:

In the drawings

Fig. 1 is a wiring diagram of the circuits involved, a portion of the phase displacing arrangement being shown in elevation and a portion of the operating tool and its immediate control mechanism as well as the printing plate operated upon being shown in elevation.

Fig. 2 is a plan view of the timing signal producing mechanism.

Fig. 3 is a diagrammatic side elevation of a reflected light embodiment of the invention.

Fig. 4 is a view taken on line 4—4 of Fig. 3 and in the direction of the arrows.

Fig. 5 is a view similar to Fig. 4 and of a transmitted light embodiment of the invention.

Fig. 6 is a bottom plan view of the magnet field, the image coil, the tensioned tool support and the tensioning adjustment arrangement.

Fig. 7 is a central sectional view through the same.

Fig. 8 is an end elevation thereof, this view being shown in inverted relation for clearness.

In Fig. 3 of the drawings, there is illustrated more or less diagrammatically, an illumination source for the device. Herein the photo-emission device is indicated by the designation PED, having the light transmitting aperture 24. This device moves linearly if the object is stationary and also is indexed or translated transversely at the completion of each longitudinal traverse, all as generally pointed out in the before mentioned patent.

Positioned beneath the photo-emissive device is a housing 70 having a base 71 that is opaque and which slidably supports a pair of object carriers 72, the object being designated by the letter O. It is a photographic positive print.

Four lamps 73 direct their illumination upon the face of the object O. This light is reflected therefrom and upwardly through an adjustable bellows structure herein shown in the form of two telescopic tubes 74 and 75, one being rigid with the housing 70 and the other mounting a lens structure designated by 76. It is quite apparent that the light reflected from the object O is passed through the lens and forms in the plane of the aperture 24 an image corresponding to that of the object, and having the variable tonal values of the object.

As the photo-emissive device is moved, the effect is one of scanning and the illumination received by the aperture at each position is that which is transmitted to the working tool to form the printing surface in accordance with, first, the image in the plane of the aperture and secondly, in accordance with the object O. When the plane of the image is equidistant from the lens 76, as the latter is from the object, the image will be the same as the object so far as size is concerned and the printing plate will be of corresponding size. When the lens is moved toward the photo-emissive device or away from the same, the image in the plane of the aperture naturally will vary in accordance with the well known laws and will be in proportion.

Reference now will be had to Fig. 5. In this form of the invention there is illustrated the same photo-emissive device PED having the aperture 24. The housing 80 herein mounts a suitable source of illumination 81 in direct alignment with the central axis of the structure. Thereabove is a plate support 82 and adjustably carried thereby as at 83 are the copy supports 84. The copy in this case is designated by OO. This housing 80 carries one portion 85 of a bellows structure herein in the form of two telescopic tubes, the other tube being designated by 86 and mounting the lens structure 87. Light from lamp 81 passes through the copy, such as a photographic negative, and then passes through the lens and forms in the plane of the aperture 24 the corresponding image of the desired size and tonal values.

It will be observed that the variation in size of this image for scanning purposes, as it were, may be varied by moving the lens toward and away from the copy in the well known manner. The printing plate formed as a result of light passing through the aperture 24 and from the copy and incident to the longitudinal traverse of said aperture and the lateral offsetting and subsequent traverse, et cetera, all as broadly described in the before mentioned patent, results in the formation of a printing plate conforming to this image and consequently to the original copy, as to tonal values and required size.

Before proceeding to a detailed description and discussion of the system embodied within this invention it appears appropriate that reference now be had to the working tool and its support and control since, as it is actuated, said tool forms the desired printing face. Reference, therefore, will be had to the right hand portion of Fig. 1 and to Figs. 6 to 8, inclusive.

In these figures the numeral 78 indicates a permanent magnet. This is of field character. It may, however, be an electro magnetic field of constant character. It has a circular bore 77 and in it is mounted the image coil 22. This image coil has extending therefrom a post or stud arrangement 79 and the same provides a bearing for a cross shaped spring member or spider 88, the latter being apertured at 88a. A threaded post extends from portion 79 through said aperture 88a and mounts a nut 89. Hence, the central bearing portion of the cross shaped flexible element 88 is rigidly connected to the image coil 22.

A pair of lock nuts 90 on the stud 91 mounts in spaced and parallel relation a similarly cross shaped flexible element or spider 92. There also is mounted on this stud by the nuts 93 a flat spring member 94 and the same is connected to the elongated member 95 that carries the socket 96 which by means of which member 97 holds the tool 23 in the adjusted position. A spring member 98 is carried by the bracket 99 in turn carried by the permanent magnet structure 78. All of the aforesaid appears in Fig. 1.

Referring to Figs. 6 to 8, inclusive, it will be noted that two ends of the cross shaped members are spaced apart by the bars 100 and 101. They are in turn spaced from the face of the supporting field arrangement 78 by other bars designated by subscript a, and similarly numbered. Screws 102 pass through two of the arm ends of each cross member and the two bars 101 and 101a and rigidly anchor said cross members to the permanent field. The other two arm ends of the cross members are rigidly secured to the member 100 by screws, or the like, 103. The bar 100a is apertured as at 104 and the bar 100 is transversely slotted as at 105. Screws 106 anchor the bar 100 in adjusted relation and the bar 100a to the permanent field 78.

Suitably secured to the underface permanent field 78 is the bearing member 107 secured by cap screw 108. The bar 100 intermediate its ends and intermediate its top and bottom planes is transversely apertured as at 109 and threaded, and a headless set screw 110 having the bearing portion 111 is mounted therein and projects toward the abutment or stop 107. The adjustment is effected for tensioning of the two cross members before mentioned by screw 110.

Since it has been found that when these members are in proper tension, a comparative low current value will be sufficient to secure the desired movement of the tool. If these members are not under proper tension, enormous current values must be utilized to effect such operation. Proper tension (tuned to resonance) is imparted to these two parallel cross members by moving the bearing point 111 inwardly which forces the block or bar 100 outwardly, relatively speaking, and when the proper adjustment of tension is obtained, the screw 106 rigidly clamp this adjustable end of the cross members to the permanent field, and the structure is in resonance.

It is to be understood that when a variable current, such as one of sine wave formation, is impressed upon image coil 22, the tool 23 reciprocates vertically or longitudinally in a direction parallel to the axis of the image coil which floats in the bore of the permanent field. This periodic movement of the tool is quite slight but is periodic in accordance with the signal. When, however, the signal is varied by the amplification, incident to the impressing of other current thereon in addition to the so-called carrier normal operating current, the image coil appropriately reacts with the permanent field and in response to such reaction the working tool is reciprocated the desired amplitude or stroke. Thus as the current supplied to the image coil varies the working tool digs into the surface of the plate A the desired depth.

It is to be understood in this form of the invention, the working tool is relatively stationary while the plate moves back and forth, traverses laterally with and in accordance with permanent field movement which is in accordance with movement of the photo-emissive device. It has been found preferably to have the copy stationary, relatively speaking, and the working tool stationary, and the other two parts move relative thereto, although the reverse relationship, as previously described, may be utilized with equal facility. The physical connection is termed the carriage.

Reference now will be had to the top part of Fig. 1 and Fig. 2, wherein there is illustrated the impulse generator for the device that provides the timing signal hereinafter referred to more particularly. This impulse generator is associated with a phase displacement arrangement so that on one stroke of the carriage in the working direction the timing signal is applied to the amplifying means, et cetera, in one phase and on the next working stroke the same signal of identical value is applied but the phase relationship is 180° to that previously imposed and these two, 180° displaced phase signals are alternatively imposed on successive working strokes. The mechanism for such action is as follows:

The rotor 10 is mounted on shaft 10a. This is connected to or formed as an extension of the longitudinal feed screw of the complete mechanism which, for example, only may be represented as that illustrated in the aforementioned patent. Accordingly, as the feed screw revolves, for carriage movement, the shaft 10a and the rotor 10 are turned at a speed proportional to or at the same speed of the feed screw, respectively. The rotor 10 is provided with teeth or segments 10b. Adjacent thereto are mounted two permanent magnets 11 and 12. The difference in the mounting or rather the position thereof, will be set forth hereinafter.

Upon each is adjustably mounted a coil. On permanent magnet 11 coil 13 is adjustably mounted at 11a while on permanent magnet 12 coil 14 is adjustably mounted at 12a. These permanent magnets are suitably mounted but magnetically insulated from the frame of the machine and the shaft 10a also passes through the frame of the machine, all as shown diagrammatically in Fig. 2, the magnets being aligned so that the polarity is NS—NS, and the coils being connected in series.

As the rotor 10 rotates, there is generated in each of the coils a current which flows providing the respective coil circuit is closed. The two coils are grounded as at G. The two coils are respectively connected by lines 13a and 14a to the poles X and Y, respectively, of a phase selector switch having the movable switch contact Z, connected in turn by line Z' to the primary winding 19 of the transformer 17.

It will be quite apparent that as the coils are adjusted longitudinally on the permanent magnets, the electromotive force generated will vary accordingly. Also, as the air gap or clearance between the rotor and magnet is decreased, more electromotive force will be generated in the coil and as the air gap is increased, less electromotive force will be generated in the coil. It has been found, for example, that a .006" air gap between the permanent magnet and the outer tip of each tooth or segment 10b will provide sufficient electromotive force for signal purposes.

It will be quite apparent that as the rotor passes the tip of the respective magnet, the electromotive force generated is of sine wave character and as each tooth or rotor segment passes, this wave form is repeated in the coil circuit. Naturally, if the switch controlling the closed circuit condition for the coil is not closed, no current will flow in that coil circuit, despite the generation of voltage therein.

From Farrady's law it can be readily calculated how many turns have to be provided and what resistance is necessary for each of the coils. They are identical. They are, however, displaced axially with reference to their angularity. For convenience, they are positioned in what might be termed general opposed relation as shown, but this is not necessary.

It will be observed from Fig. 1 that permanent magnet 11 at any one instant for rotor position, by way of example, is immediately opposite the center line of tooth 10b or segment of the rotor while at the same instant, the tip of the permanent magnet 12 is in alignment with the center line of a tooth space. When the magnet is positioned as last mentioned, no voltage is generated. When the magnet is positioned as first mentioned, maximum voltage is generated and as stated, this voltage increases and decreases and the resulting wave form is of sine character and the current is of alternating current type.

The switch member Z is normally biased to close a circuit to switch contact X. During the interval this circuit is closed, the coil 13 only supplies the signal to the remainder of the device and this current as stated, is of a definite voltage, is alternating in character and is passed on to the transformer 17.

Again referring by way of example to the patent, it will be recalled the reciprocating carriage of the machine disclosed therein completes a working stroke or traverse and then returns to initial position and is indexed following the completion of the stroke and the time cycle of reciprocation is repeated. All of this is automatic.

*Phase selector and ratchet relay operation*

To select the proper phase so that on adjacent strokes of the carriage the cutting tool will space the pits in plate A formed in proper staggered relation, the following operation is carried out: When trip switch 21, which is in series with a proper voltage supply and coil 20, is closed momentarily by action of the carriage on the return stroke, the coil 20 is energized and attracts armature 200 to pole 201. Attached to armature 200 is pawl 202. This engages ratchet 204 and indexes it one step or tooth. Attached to ratchet 204 is cam 203. Riding on cam 203 is a leaf spring 205, one end of which is attached to an insulated fibre stack 206. Riding in sliding contact on the other end of spring 205 is an insulator 207 which forces leaf spring 205 carrying contact Z into contact with contact Y. This completes the coil 14 circuit and voltage from the impulse generator previously described flows from contact Y through contact Z to line Z'.

On the next return stroke of the carriage the trip switch 21 is again closed momentarily. The armature 200 is again attracted to the pole 201 and the pawl 202 again engages the ratchet 204 and indexes it another step or tooth. At this time leaf spring 205 has its extension 208 drop down into the depression 209 in the cam 203. Contact Z then engages contact X. The voltage now flows from coil 13 through contact X to Z and thence to Z'. This permits the pits formed in plate A to be positioned in staggered relation with the previous row of pits depending on which contact is used.

The pawl 202 is so fastened to the armature 200, as indicated at 210 and 211, so that on its upward movement when urged by spring 211, it slips over the ratchet tooth and aligns itself for the next indexing. The upward movement of the armature 200 is limted by stop bar 212 while stop bar 213 keeps the ratchet 202 from overthrowing. The leaf spring 205 to which is attached insulator 207 is spring tensioned so that it is urged toward base 214. The ratchet 204 is steel and cam 203 is fibre. The leaf springs carrying contacts X, Y, and Z, supported in stack 206, are phosphor bronze. Spring 215 urges armature 200 away from pole 201 and 212 is the stop.

Upon completion of the initial stroke, the carriage of the machine, therefore, mechanically closes switch 21 momentarily. This closes the ratchet relay circuit which indexes the ratchet and cam one ratchet tooth or increment. Such indexing causes the switch contact Z to engage the switch point Y in the circuit of the coil 14 which closes the circuit through this coil to the line Z' before mentioned, and simultaneously opens the circuit through the switch point X, including the coil 13. This coil circuit including coil 14, however, is maintained closed throughout the next working stroke by the indexable cam 203. Upon completion of that working stroke, the ratchet relay 20 is again energized and the circuit through coil 13 is established. This cycle is repeated as long as the carriage is reciprocated. Therefore, on every new stroke of the carriage, there will be introduced into the transformer 17 a signal from the coil 14 which signal is displaced 180° in phase from the signal produced in coil 13, and utilized in the preceding stroke of the carriage.

The effect is as follows: If we assume that a table is attached to the feed screw of the machine which revolves rotor 10 through shaft 10a and if we assume the pitch of this feed screw is such that one complete revolution of rotor 10 advances said table carrying the proper recording medium forward ¼", the rotor in this instance having twelve segments, there would be produced in either coil twelve surges of voltage per rotation of rotor 10, which surges would be translated by the amplifier arrangement to the cutting tool 23. This results in twelve pits being formed on the recording medium, the plate A. The centers of these pits would then be spaced ¹⁄₄₈" apart. This spacing and pitting is continued throughout a definite length of the stroke of the carriage.

The carriage, as will be apparent, is then indexed or traversed laterally the proper distance so that another longitudinal line of pits may be effected on the plate A by the working tool 23. However, this second stroke has resulted in current now being supplied by the coil 14 which is at 180° to the previous current, wherefore, the resulting pits formed throughout the forward stroke of the carriage in the second traverse of the tool 23 relative to the plate A will result in pits being formed that are displaced half the distance between the previous or adjacent row of pits, although the spacing in this second row of pits is the same as that in the preceding row.

The spacing between adjacent rows of pits is determinable solely by the amount of indexing. The offsetting or staggering of the pits in adjacent rows is determined by the phase displacement. The result is that the working tool 23 forms in the plate a pitted surface, the depth and areas of the pits being governed by the control of the cutting tool 23, as hereinafter described, and as also broadly recited in the before mentioned patent by way of example, so that the surface of plate A has a true half tone formation.

It is, therefore, observed, that in regard to the foregoing that the switch point Z maintains contact with the point Y during the entire second working stroke of the tool and that upon completion of that stroke the circuit arrangement is reconditioned through the ratchet relay and cam so that on the third working stroke the timing signal is supplied to the amplifying device, et cetera, by the coil 13, and this alternation is repeated for successive working strokes.

Initially hereinbefore, it has been stated that the copy can remain stationary and that the printing plate material can also remain stationary and that the carriage, as that term is used, can carry the working tool and the means for picking up the light signal from the copy. It has also been stated this relationship might be reversed. As stated immediately preceding, the machine may be so arranged that the copy will remain stationary, the light signal pick-up device may move in accordance with carriage movement, the tool support may remain stationary and the printing plate may move in accordance with and by carriage movement. The reverse of this may be utilized, as will be quite evident from an understanding of the before mentioned patent, and the preceding description herein.

Since the preceding patent is quite comprehensive in its disclosure of pit formation and the results effected thereby, it is believed no further description is necessary for the understanding of this invention. Also, it will be quite apparent that the specific description herein relating to Fig. 2, et cetera, relates to improvements capable of inclusion in a machine of the general character set forth in the before mentioned patent.

Reference now will be had more particularly to the electrical system included between the aperture 24 of the light signal pick-up arrangement, the timing signal generator, and the image coil 22 effective upon the working tool, and this is all diagrammatically disclosed in Fig. 1.

The general periodicity of the reciprocation or working stroke of the tool 23 is determined by the frequency of the impulse generator provided timing signal as aforesaid, and the length of that stroke is determined by the light intensity of the object being scanned. The sine wave form signal of predetermined voltage is one that can be modified or controlled by rheostat 18. Accordingly, the proper and required voltage can be introduced into the primary 19 of the modulating transformer 17.

The light intensity may be derived from a light reflected upon an opaque object including a photograph or may be passed through a translucent or semi-transparent object, such as a film or negative, all as previously described. In any event it is preferable that the light utilized be of beam type and such a light beam is provided through a proper focusing arrangement, etc.

Transmitted or reflected light is supplied to the aperture 24 in a photo-emissive device PED. This device has impressed across its negative and positive terminals C and D, respectively, 1000 volts of direct current, the source of which is indicated in the apparatus indicated by PS which includes a source of alternating current, a rectifier type tube, suitable chokes and condensers to provide a well filtered direct current voltage.

The photo-emissive device PED is an evacuated construction of the multiplier type, having the cathode 25 connected to the negative terminal C. The successive cathodes 25—A-25—F inclusive, respectively, are each connected to resistances 26—A to 26—F, respectively, with a single pole double throw switch Sw—1 interposed between 25—F and 26—F. These resistances are connected in series and at one end to the negative terminal C and ultimately to the positive terminal D, forming a voltage divider that places each successive cathode at a higher electrical potential from the previous one from negative to positive. Another resistance 27 is connected to the resistance 26—F and to the positive terminal D of the voltage divider. Resistance 27 is in series with a single pole double throw switch Sw—3 connected to the resistance 29, which in turn is in series with collector 28 through a single pole double throw switch Sw—2. This collector means 28 also is in series with the other pole of switch Sw—2 and positive terminal D by line 28a. Resistance 29 also is connected to the positive terminal D of the device by a single pole double throw switch Sw—4 and line 27b. In series with terminal D and switch Sw—3 is resistance 27 through switch Sw—4 and line 27b. Resistance 27a is in series with terminal D and the other poles of switch Sw—4.

In the operation of this modulator two systems are necessary as follows: In using reflected light as from a photographic copy when the maximum light enters the aperture 24, the image coil 22 has maximum amplitude. When using transparent copy, such as a photographic negative the image coil 22 has maximum amplitude when a minimum of light enters the aperture 24. The system using positive copy will be described, first, as follows:

In this operation, if it is assumed that a light ray of low light intensity enters the aperture 24, it will cause cathode 25 to emit a few electrons, which in turn multiply their effect through the successive cathodes 25—A to 25—F inclusive, in logarithmic proportion so that energy which is collected on collector 28 in the form of electrical current, is what might be termed a comparatively large number of electrons, whereas the light intensity impressed on the aperture 24 only frees a few electrons at the cathode 25. This occurs because of the well known law of secondary emission, and an example of amplification of low light intensity will be set forth hereinafter.

This collected current is always in direct proportion to intensity of the light impressed at the aperture 24. It will be apparent that low light intensities can be utilized; hence, finer tonal values can be recorded on plate A, dependent upon size of aperture 24.

This collected energy at 28 is then impressed on the subsequent circuit together with the timing signal before mentioned, supplied by line Z'. A connection 29a magnetically and electrostatically shielded, connects collector 28 to the signal grid 30 of a vacuum tube V—1. The cathode 31 of this tube is in series with a single pole, double throw switch Sw—5, which has a common ground with the transformer secondary 17a of the transformer 17 at 32. The other terminal of this transformer is connected to the positive terminal D of the emissive device PED, as shown.

It will be observed that due to the arrangement of the switches indicated by Sw—1, Sw—2, Sw—3 and Sw—4 that the collector 28 is connected to the signal grid 30 of the tube V—1. It will also be observed that the sign of this current is positive in polarity and that it becomes more positive in polarity as more light is admitted to the aperture 24.

For positive copy operation, the switches above mentioned are indicated to be thrown to the left as shown by the solid lines in the drawings, Fig. 1. The subsequent action of the modulator tube V—1 is as follows:

In the vacuum tube V—1 there is provided said signal grid 30, a screen grid 60, a plate 33, and a cathode 31. The plate 33 and the screen grid 60 are provided with a source of direct current voltage to maintain them at the proper positive potential. The grid 30 is in series with the collector 28, the grid resistance 29, together with the direct current voltage of the photoemissive device PED and the secondary 17a of transformer 17. This is also in series with cathode 31, providing the grid return circuit.

Impressed on the secondary 17a of transformer 17 is the alternating current voltage supplied by the induced current in either coil 13 or coil 14, depending upon which voltage has been selected by the phase selector 203. This voltage is capable of regulation as by adjustable resistance 18. Accordingly, as this alternating current voltage is introduced into the grid circuit as before mentioned and as the PED current at collector 28 changes, due to more or less light entering aperture 24, the changing bias on grid changes and permits more or less of the alternating current signal to appear in the plate 33 circuit. As less light is admitted to aperture 24, less of the signal appears in the circuit of plate 33 and as more light is admitted to aperture 24 more of the signal appears in the plate 33 circuit, and this signal is proportional to the amount of light that falls on initial cathode 25.

In the negative copy system, using transmitted light and a photographic negative as copy, it is necessary to change the sign of the current that is impressed on the grid 30 of tube V—1 to negative polarity. This is accomplished by throwing switches Sw—1, Sw—2, Sw—3 and Sw—4 to the right, as shown by the dotted lines in Fig. 1, which places the connection 29a at one end at 25—F and the other end at grid 30 of tube V—1, and establishes the correct electrical circuit for the other components generally indicated by the drawing in Fig. 1.

At the same time the other single pole double throw switch Sw—5 is thrown to the right, as shown by dotted lines in Fig. 1. All switches may be arranged for singular simultaneous operation. This switch Sw—5 is in series with cathode 31 of tube V—1 and also with a cathode bias resistor R—1 of the proper value and a cathode bias filter C—1. This resistor R—1 places the correct negative bias voltage on signal grid 30 of tube V—1 to permit the alternating current signal induced in the transformer secondary 17a to enter the plate 33 circuit of tube V—1. When the light entering aperture 24 is of minimum value, the bias voltage on grid 30 of tube V—1 supplied by negative bias resistor R—1, will permit the maximum amplitude of the signal to appear in the plate 33 circuit. As the maximum value of light entering aperture 24 causes cathode 25—F to impress the maximum amount of voltage on grid 30 this will cause the negative bias voltage to be greater and will cause less of the timing signal to appear in the plate circuit. Hence, the minimum amount of light will cause the greatest amount of amplitude of the signal and the maximum amount of light will cause the minimum of amplitude in the negative copy system.

The subsequent action of the timing signal is as follows: The plate 33 of the vacuum tube V—1 is connected by line 34 to a blocking condenser 35. It is also connected to a resistor 36, which is connected by line 37 to the direct current power supply as shown at D—1. In series with the blocking condenser 35 is a gain control 38 and adjustably tapped thereto as at 39 is a grid connection of vacuum tube V—2, having the grid 40, plate 41 and cathode 42. The cathode 42 of the tube V—2 is connected to a cathode resistor 43 and a cathode bias filter 43a to ground through a normally closed switch 44.

In the desired working stroke of the carriage this cathode 44 is at the same positive potential as the plate 41, but the inclusion of cathode resistor 43 places grid 40 at the correct negative bias to permit the plate circuit including plate 41 to draw current in proportion to the signal impressed on grid 40 of tube V—2. The cathode bias filter 43a filters out the alternating current component in the plate-cathode circuit and provides a ripple free negative bias voltage for grid 40.

On the non-working or return stroke of the carriage the switch 44 is opened automatically incident to carriage movement and held open throughout that return stroke so there is no negative bias on the grid 40. This causes the tube V—2 to become operative over a range which is represented by the non-linear portion of its operating characteristic curve, and hence, only static plate current flows in tube V—2 under this circumstance and hence tube V—2, insofar as the remainder of the system and copy reproduction is concerned, is ineffective or inoperative. It is to be observed that the blocking condenser 35 only passes to the tube V—2 or rather the grid 40 thereof only an alternating component of the current supplied by plate 33 of the tube V—1.

The plate 41 of tube V—2 is connected to a point of positive voltage as at 45 on the line 37 before mentioned, through a series resistor 46. This series resistor is included across the terminals of the primary 47a of a transformer 47 with a series condenser 48. This transformer 47 has two secondaries 49a and 49b, the purpose of which is to provide inverse feedback from the transformer 50 to provide a wave form correction inherent in transformers of this type.

For this purpose also there is included two tubes 51 in push-pull relation and connected as shown. The screen grids 51a of these tubes are connected by line 52 to a source of positive direct current voltage. The plates 51b of these tubes are connected to the primary 50a of transformer 50 before mentioned, and the midpoint of transformer primary 50a is also connected to line 52. The signal grids 51c of these tubes 51 are connected to the transformer secondaries 49a and 49b. The cathodes 51d of these tubes are connected to ground as at 53. The tertiary winding 54 of transformer 50 is connected at opposite ends to the adjacent ends of the secondaries 49a and 49b of the transformer 47. The midpoint of this winding 54 is grounded through a resistor 55 to provide correct negative bias voltage on grids 51c of the tubes 51.

The transformer secondary winding 56 of the transformer 50 is connected to the image coil 22, the other terminal of this coil being grounded as at 22a. This secondary winding 56 is of dual character, the connection to the image coil being to a tap to match the impedance of the image coil 22, one winding end being grounded at 56a, the other at 56b in series with an alternating current voltmeter 56c. The grounds 22a and 56a, with the image coil 22 in series, complete the electrical circuit. This is to insure proper pulsation of the image coil 22 in response to the carrier signal and proper reciprocation of that coil in response to the changing light admitted to aperture 24, all of which originates as a result of the combined timing signals and changing bias impressed on signal grid 30 of tube V—1.

D—1 indicates a conventional source of alternating current, which is supplied to a transformer E which through the apparatus indicated, including generally the tube F, which is of rectifying character, and a filter network as illustrated in Fig. 1, supplies direct current of the proper values and at the proper voltages to lines 52, 37 and 45, as well as to the other elements of the device such as the screen grid 60 of the tube V—1.

*Non-linear modulator superiority as a photo-cell amplifier*

In the use of amplifiers to amplify low level light intensities, great difficulty is encountered when the source of light is so weak that a great deal of amplification is necessary. If amplification is attempted by the direct coupled method, the variations in the contact potential, et cetera, high voltage power supplies or a power supply for each stage is encountered. This is difficult to accomplish as has been proven by numerous previous attempts. Another system to get high gain amplification from photo-cell currents contemplates the use of a light chopper interposed between the light source and the photo-cell. This creates an alternating current signal that can be amplified to any desired value but the difficulty is that in the case of the present amplifier it was necessary to interpose a timing signal into the circuit so that work could be done at regularly timed intervals and this work could be modified in accordance with varying amounts of light. Previous attempts along this theory used a phototube coupled direct to a tube of the pentagrid mixer type using one grid for the photo-cell connection and the oscillator grid to introduce the timing signal into the circuit. Other types of multi-element tubes were used in trying to achieve the same result, none proving entirely satisfactory.

In this instance, using a pentode type tube and having all the elements at their proper voltage and current values, advantage is taken of the fact that the timing signal can be introduced into the circuit and this signal modulated by the current developed in the photo-cell as the result of light values admitted to the cathode of the photo-cell. In this way, by operating the tube at its proper linear characteristic, more minute changes in light values will be reproduced in the tube and subsequently properly recorded due to the fact that this change in light value acts directly as a bias on the signal grid and controls this grid to a degree impossible to achieve in any other way so far as now known. Since the modulated signal appears in the plate circuit of the modulating tube in direct proportion to the light value admitted on the cathode of the photo-cell, it may be passed on to any number of succeeding amplifier tubes as an alternating current signal of varying amplitude. No limits are then placed on the amplifier in faithful reproduction of the input signal and no discrimination is made regarding frequencies that might be developed in the copy source. This eliminates the introduction of development of any spurious frequencies and, therefore, eliminates any possibility of any production of spurious copy on the plate A.

By way of example only, the following illustration is set forth, which has actually been utilized:

A 5 x 7 or 35 sq. in. copy has been illuminated with a 600 watt incandescent light source and this light reflected from the copy has been passed through a lens structure having a 4.5 f. aperture, and at a distance of approximately 8" the image in the plane of the light pickup device PED or rather aperture 24 thereof may be assumed to be of the same size. In other words, in the particular example, the lens structure is positioned midway between the copy and the aperture. The aperture is .028" in per side. From this it can be readily calculated what is the intensity of the light lumens that are picked up through this aperture and this is assuming the maximum value of such illumination, the minimum value of the lumens naturally being zero when there is, for that particular portion of the image, no light present in the plane of the aperture 24 at that particular instant.

The photo-electric multiplying device PED has been determined to operate on the formula, when the intensity is equal to ten times the square root of the voltage of any one stage divided by three, it being assumed the voltage across all stages is substantially the same, broadly speaking. This square root is taken to the $n$th power, $n$ representing the number of amplification stages through which the picked-up illumination or emission is passed. Herein six stages are illustrated.

The result is that in the example given, approximately 23,600 microamperes are collected at the collector 28 per lumen of light intensity supplied to the aperture 24. It is readily apparent, therefore, that extremely lower light intensities present at the aperture 24 will be transmitted to the subsequent electrical control system for plate reproduction and for reasons assigned, the reproduction in the plate will be a faithful copy provided the electrical reproducing system is properly controlled and of substantially the character hereinbefore disclosed.

It has been pointed out hereinbefore that this system does not have spurious frequencies created or introduced therein and this is given as but one example of the possible introduction of error. The instant invention, therefore, reproduces on the printing plate A a surface that will print a faithful half-tone reproduction with all the essential characteristics of the original copy but in addition thereto will include therein all the tonal values and gradations present in the original copy within the limitations of the plate development, it being, of course, borne in mind that the system as disclosed has been specifically illustrated as providing in the plate pits spaced a predetermined distance apart linearly and with the adjacent rows thereof spaced half that distance apart. This forms what might be termed a "screen" of about 65 lines. Plates have been made that include 85 line. If it be assumed that 8 ft. candles are distributed over 35 sq. in., that is the 5 x 7 objective, there will be approximately 4.4 ft. candle illumination per sq. in. The total foot candles impressed on the aperture, therefore, is roughly 4⅜, multiplied by the square of .028", or roughly, .0025 ft. candles, which it will be recognized is very low light intensity at aperture 24.

This specific example is set forth merely to indicate the range of sensitivity possible to be accommodated by this invention and is in no sense to be considered as an example of limitation.

In Fig. 1 of the drawings, certain values are assigned to certain resistances and condensers, and certain designations of commercial tubes have been applied. It is to be understood these values are given by way of example only and not by way of limitation and these tube designations are also given by way of example only and not by way of limitation.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claims.

The invention claimed is:

1. A system for obtaining phase displacement of signals including in combination a segmented rotor of magnetic type, a pair of magnets, a coil means associated with each magnet, and a signal supply circuit selectively connectable to each coil means, said magnets having a displacement at least equal to ($n$ plus ½) the rotor segment spacing where $n$ is the number of full segments between magnets, each coil means included in the magnetic circuit being adjustably mounted upon the associated magnet for regulation voltage derived from said coil means.

2. A system for obtaining phase displacement of signals including in combination a segmented rotor of magnetic type, a pair of magnets, a coil means associated with each magnet, and a signal supply circuit selectively connectable to each coil means, said magnets having a displacement at least equal to ($n$ plus ½) the rotor segment spacing where $n$ is the number of full segments between magnets, each magnet being of linear character, and means adjustably supporting each magnet for longitudinal adjustment toward and away from the segmented rotor for voltage regulation.

3. A system for obtaining phase displacement of signals including in combination a segmented rotor of magnetic type, a pair of magnets, a coil means associated with each magnet, and a signal supply circuit selectively connectable to each coil means, said magnets having a displacement at least equal to ($n$ plus ½) the rotor segment spacing where $n$ is the number of full segments between magnets, each coil means included in the magnetic circuit being adjustably mounted upon the associated magnet for regulation voltage derived from said coil means, each magnet being of linear character, and means adjustably supporting each magnet for longitudinal adjustment toward and away from the segmented rotor for voltage regulation.

4. In a copy reproducing system, a tool support, means for providing a magnetic field, a coil therein and responsive thereto, a control circuit for said coil, and a resonant, tension adjustable, device for said support and said coil, said device including a member resiliently connected at one end to a relatively stationary base and resiliently connected to the coil, and means of a resonating character interposed between the base and coil, said resonating means having adjustable mounting with one of the two last mentioned and relatively fixed mounting upon the other for initial tension inclusion in said resonating means.

5. In a copy reproducing system, a tool support, means for providing a magnetic field, a coil therein and responsive thereto, a control circuit for said coil, and a resonant, tension adjustable, device for said support and said coil, said device including a non-magnetic spider means centrally connected to the coil and tool support and having fixed anchorage for certain of the arms of the spider means and adjustable anchorage for other arms for spider tensioning.

6. In a copy reproducing system, a tool support, means for providing a magnetic field, a coil therein and responsive thereto, a control circuit for said coil, and a resonant, tension adjustable, device for said support and said coil, said device including a non-magnetic spider means centrally connected to the coil and tool support and having fixed anchorage for certain of the arms of the spider means and adjustable anchorage for other arms for spider tensioning, said anchorages being carried by said field providing means.

7. In a copy reproducing system, a tool support, means for providing a magnetic field, a coil therein and responsive thereto, a control circuit for said coil, and a resonant, tension adjustable, device for said support and said coil, said device including a non-magnetic spider means centrally connected to the coil and tool support and having fixed anchorage for certain of the arms of the spider means and adjustable anchorage for other arms for spider tensioning, said spider means including a plurality of parallel, spaced, substantially identical spider members in registering relation.

8. In a copy reproducing system, a tool support, means for providing a magnetic field, a coil therein and responsive thereto, a control circuit for said coil, and a resonant, tension adjustable, device for said support and said coil, said device including a non-magnetic spider means centrally connected to the coil and tool support and having fixed anchorage for certain of the arms of the spider means and adjustable anchorage for other arms for spider tensioning, said spider means being X-shaped with two arm ends fixed, means connecting the two other arms together, and adjustable means associated with the connecting means midway between the connections to the arms for effecting tension adjustment of said means, and means for anchoring the tension adjusted ends.

9. In a copy reproducing system, a tool support, means for providing a magnetic field, a coil therein and responsive thereto, a control circuit for said coil, and a resonant, tension adjustable, device for said support and said coil, said device including a non-magnetic spider means centrally connected to the coil and tool support and having fixed anchorage for certain of the arms of the spider means and adjustable anchorage for other arms for spider tensioning, said spider means including a plurality of parallel, spaced substantially identical spider members in registering relation, each spider member being X-shaped and in registering relation, two ends of each spider member having fixed connection and anchorage, means connecting the other two ends of each of said members together, adjustable means associated with said connecting means and midway between the connections to the arms and midway between the outer planes of the registering spider members for singularly effecting tension adjustment simultaneously in said spider members and to a like degree, and means for anchoring the tension adjusted ends.

10. A selector switch arrangement including a pair of spaced contact means, other contact means arranged for relative contact therewith for circuit control purpose, a momentarily operable relay, a cam operatively associated with said other contact means for such selective contact, a ratchet, and a pawl for indexing said ratchet and cam and responsive to relay operation.

11. A selector switch arrangement as defined by claim 10, characterized by the addition of means limiting pawl travel for limiting ratchet rotation incident to relay responsive travel of said pawl.

12. A selector switch arrangement as defined by claim 10, characterized by the addition of means normally constraining the pawl to predetermined position in opposition to relay operation but insufficient in amount to overcome the force of said relay when operated.

13. In a copy reproducing system the combination of a photo-emissive multiplying device for low illumination intensity effect transmission, a non-linear modulating tube including a grid having a predetermined static bias and series connected to said device for changing the bias in accordance with illumination intensity, a timing signal device inductively coupled to the signal grid circuit of said tube for alternating current signal transmission, the signal appearing in the plate circuit of said modulating tube, a gain tube operatively connected to the modulating tube to amplify the modulated alternating current from the first tube, a blocking condenser in the plate circuit of the first tube for decoupling the first tube plate voltage from the grid circuit of the second tube, and a working tool, electrically operated, control operatively connected to the second tube for tool operation in accordance with the timing signal and the illumination effect transmitted thereto.

14. A system as defined by claim 13, characterized by the addition of a normally closed switch in series with the cathode resistor of the second tube for providing grid bias for signal transmission, and automatically operable means for opening said switch for preventing signal transmission to said control.

15. A system as defined by claim 13, characterized by the addition of a normally closed switch in series with the cathode resistor of the second tube for providing grid bias for signal transmission, and automatically operable means for opening said switch for preventing signal transmission to said control, the timing signal device comprising a segmented rotor of magnetic type, a pair of magnets, a coil means associated with each magnet, and a signal supply circuit selectively connectible to each coil means, said magnets having a displacement at least equal to (n plus ½) the rotor segment spacing where n is the number of full segments between magnets.

16. A system as defined by claim 13, characterized by the inclusion between the second tube and said control of a transformer for reproducing the plate signal of the second tube, a pair of amplifying tubes inductively coupled in push-pull relation and to said transformer for duplicating and increasing of the transformer received signal.

17. A system as defined by claim 13, characterized by the inclusion between the second tube and said control of a transformer for reproducing the plate signal of the second tube, a pair of amplifying tubes inductively coupled in push-pull relation and to said transformer for duplicating and increasing of the transformer received signal, a tertiary wound transformer connected to the push-pull tubes and the first transformer for impedance matching coupling to said control.

18. In a copy reproducing system the combination of a photo-emissive multiplying device for low illumination intensity effect transmission, a non-linear modulating tube including a grid having a predetermined static bias and series connected to said device for changing the bias in accordance with illumination intensity, a timing signal device inductively coupled to the signal grid circuit of said tube for alternating current signal transmission, the signal appearing in the plate circuit of said modulating tube, a gain tube operatively connected to the modulating tube to amplify the modulated alternating current from the first tube, a blocking condenser in the plate circuit of the first tube for decoupling the first tube plate voltage from the grid circuit of the second tube, a working tool, electrically operated, control operatively connected to the second tube for tool operation in accordance with the timing signal and the illumination effect transmitted thereto, a normally closed switch in series with the cathode resistor of the second tube for providing grid bias for signal transmission, and automatically operable means for opening said switch for preventing signal transmission to said control, the timing signal device comprising a segmented rotor of magnetic type, a pair of magnets, a coil means associated with each magnet, and a signal supply circuit selectively connectible to each coil means, said magnets having a displacement at least equal to (n plus ½) the rotor segment spacing where n is the number of full segments between magnets.

19. A system as defined by claim 13, characterized by the inclusion between the second tube and said control of a transformer for reproducing the plate signal of the second tube, a pair of amplifying tubes inductively coupled in push-pull relation and to said transformer for duplicating and increasing of the transformer received signal, a normally closed switch in series with the cathode resistor of the second tube for providing grid bias for signal transmission, and automatically operable means for opening said switch for preventing signal transmission to said control.

20. A system as defined by claim 13, characterized by the inclusion between the second tube and said control of a transformer for reproducing the plate signal of the second tube, a pair of amplifying tubes inductively coupled in push-pull relation and to said transformer for duplicating and increasing of the transformer received signal, a normally closed switch in series with the cathode resistor of the second tube for prividining grid bias for signal transmission, and automatically operable means for opening said switch for preventing signal transmission to said control, a tertiary wound transformer connected to the push-pull tubes and the first transformer for impedance matching coupling to said control.

21. In a copy reproducing system the combination of a photo-emissive multiplying device for low illumination intensity effect transmission, a non-linear modulating tube including a grid having a predetermined static bias and series connected to said device for changing the bias in accordance with illumination intensity, a timing signal device inductively coupled to the signal grid circuit of said tube for alternating current signal transmission, the signal appearing in the plate circuit of said modulating tube, a gain tube operatively connected to the modulating tube to amplify the modulated alternating current from the first tube, a blocking condenser in the plate circuit of the first tube for decoupling the first tube plate voltage from the grid circuit of the second tube, a working tool, electrically operated, control operatively connected to the second tube for tool operation in accordance with the timing signal and the illumination effect transmitted thereto, a transformer included between the second tube and said control for reproducing the plate signal of the second tube, a pair of amplifying tubes inductively coupled in push-pull relation and to said transformer for duplicating and increasing of the transformer received signal, said timing signal device including a segmented rotor of magnetic type, a pair of magnets, coil means associated with each magnet and a signal supply circuit selectively connectable to each coil means, said magnets having a displacement at least equal to (n plus ½) the rotor segment spacing where n is the number of full segments between magnets.

22. In a copy reproducing system the combination of a photo-emissive multiplying device for low illumination intensity effect transmission, a non-linear modulating tube including a grid having a predetermined static bias and series connected to said device for changing the bias in accordance with illumination intensity, a timing signal device inductively coupled to the signal grid circuit of said tube for alternating current signal transmission, the signal appearing in the plate circuit of said modulating tube, a gain tube operatively connected to the modulating tube to amplify the modulated alternating current from the first tube, a blocking condenser in the plate circuit of the first tube for decoupling the first tube plate voltage from the grid circuit of the second tube, a working tool, electrically operated, control operatively connected to the second tube for tool operation in accordance with the timing signal and the illumination effect transmitted thereto, a transformer included between the second tube and said control for reproducing the plate signal of the second tube, a pair of amplifying tubes inductively coupled in push-pull relation and to said transformer for duplicating and increasing of the transformer received signal, a tertiary wound transformer connected to the push-pull tubes and the first transformer for impedance matching coupling to said control, said timing signal device including a segmented rotor of magnetic type, a pair of magnets, coil means associated with each magnet and a signal supply circuit selectively connectable to each coil means, said magnets having a displacement at least equal to (n plus ½) the rotor segment spacing where n is the number of full segments between magnets.

23. In a copy reproducing system the combination of a photo-emissive multiplying device for low illumination intensity effect transmission, a non-linear modulating tube including a grid having a predetermined static bias and series connected to said device for changing the bias in accordance with illumination intensity, a timing signal device inductively coupled to the signal grid circuit of said tube for alternating current signal transmission, said timing signal device including a segmented rotor of magnetic type, a pair of magnets, coil means associated with each magnet, said magnets having a displacement at least equal to (n plus ½) the rotor segment spacing where n is the number of full segments between magnets, a pair of spaced contact means each in series with a coil means, other contact means arranged for selective contact therewith for circuit control purpose, a momentarily operable relay, a cam operatively associated with said other contact means for such selective contact, a ratchet, and a pawl for indexing said ratchet and cam and responsive to relay operation, said other contact means being connected to the inductive coupling, the signal appearing in the plate circuit of said modulating tube, a gain tube operatively connected to the modulating tube to amplify the modulated alternating current from the first tube, a blocking condenser in the plate circuit of the first tube for decoupling the first tube plate voltage from the grid circuit of the second tube, and a working tool, electrically operated, control operatively connected to the second tube for tool operation in accordance with the timing signal and the illumination effect transmitted thereto.

JOSEPH A. BENNETT.